United States Patent [19]

Obearle

[11] 4,029,331
[45] June 14, 1977

[54] VEHICLE SUSPENSION SYSTEM

[76] Inventor: Adolph Richard Obearle, 207 Aero Ave., Schertz, Tex. 78154

[22] Filed: Jan. 26, 1976

[21] Appl. No.: 652,209

[52] U.S. Cl. .............................. 280/112 R; 267/12; 267/20 R
[51] Int. Cl.² ....................................... B60G 11/00
[58] Field of Search ........... 280/112 R, 111, 112 A, 280/719, 726; 267/28, 20 R, 13, 14, 15, 11, 12

[56] References Cited
UNITED STATES PATENTS

| | | | |
|---|---|---|---|
| 403,885 | 5/1889 | Hironimus | 267/12 |
| 620,952 | 3/1899 | Murphy | 267/12 |
| 842,591 | 1/1907 | Thompson | 280/112 R |
| 1,498,956 | 6/1924 | Duhrsen | 267/12 |
| 2,034,577 | 3/1936 | Hickman | 267/20 R |
| 2,043,889 | 6/1936 | Erb | 267/20 R |

*Primary Examiner*—Philip Goodman

[57] ABSTRACT

A vehicle suspension system includes first and second frame members which project substantially downwards from a vehicle frame, and first and second axle bearer means which are attached to the first and second frame members, respectively, for supporting a longitudinal axle. First and second longitudinal control bars are pivotably connected to one another at respective centers thereof. An extremity of each leaf spring is attached to the first and second axle bearer means, respectively, and the first and second control bars are attached with the ends thereof on the other side of the center to the first and second frame members, respectively.

5 Claims, 9 Drawing Figures

VEHICLE SUSPENSION SYSTEM

BACKGROUND OF THE INVENTION

1. Field of the Invention

The invention relates to a suspension system for vehicles.

2. Description of the Prior Art

A number of suspension systems for vehicles are known which permit both a relatively smooth ride and enhance the stability of the vehicle when moving at speed on a rough road. The known systems, are, however, either relatively complex, or else comprise the quality of the ride at the expense of complexity.

SUMMARY OF THE INVENTION

It is therefore, an object of the present invention to devise a vehicle suspension system which is stable and yet provides a smooth ride.

This object is achieved by providing a scissor-type leverage system, whereby an upward force exerted on one wheel of a common axle results in an equal and oppositely directed downward force on the other wheel of the axle.

I accordingly provide first and second frame members projecting substantially downwards from a vehicle frame, and first and second axle bearer means attached to the first and second frame members, respectively, for supporting a longitudinal and normally horizontal axle. The axle has two opposite ends; one wheel is attachable to at least one of the ends.

First and second substantially horizontal and longitudinal control bars have respective centers, and are pivotably connected to one another at the centers in a substantially mirror-symmetrical and scissor-type manner. Each of the control bars is formed as a leaf spring on one side of the center. Each leaf spring has a downwardly opening concavo-convex curvature which extends at least partly to an extremity of the leaf spring, and the leaf springs of the first and second control bars are attached to the second and first axle bearer means near the extremities of the leaf springs, respectively. The ends of the control bars on the other side of the center are attached to the first and second frame members, respectively.

In one version of my invention I provide first and second compression springs which have upper and lower ends, respectively. The lower ends of the compression springs are attached to the leaf springs and to the axle bearer means, respectively, while the upper ends of the compression springs are attached to the frame members and the control bar ends, respectively.

In another version of my invention the first and second frame members are unitary with the first and second axle bearer means, respectively, and the ends of the first and second control bars are pivotably attached to the first and second frame members, respectively. The latter are formed with recesses for the leaf springs of the second and first control bars to extend thereinto for being attached to the first and second frame members respectively.

Brief Description of the Drawing

My invention will be better understood with reference to the accompanying drawing in which.

DESCRIPTION OF THE PREFERRED EMBODIMENT

Figure 1:
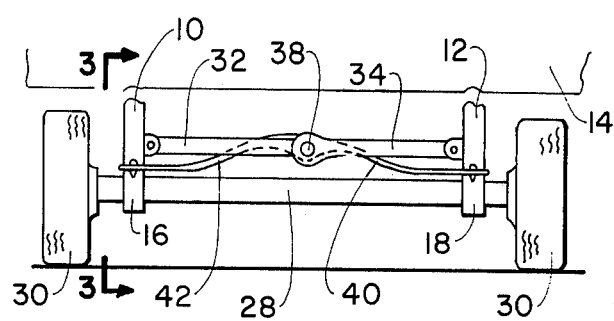
FIG. 1 is an elevation of one version of a vehicle suspension system, according to my invention.
Figure 5:
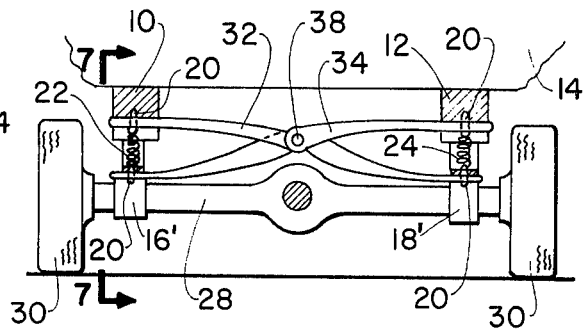
FIG. 5 is another version of the suspension system according to my invention, shown in elevation.
Figure 2:
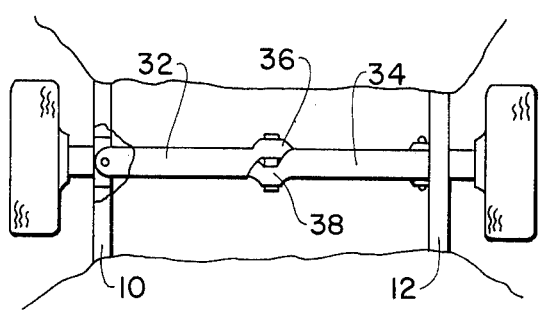
FIG. 2 is a plan view of FIG. 1.
Figure 6:
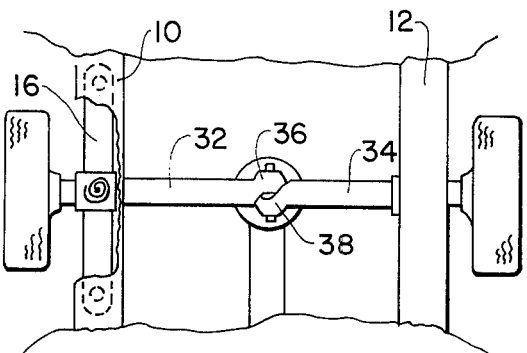
FIG. 6 is a plan view of FIG. 5.
Figure 4:
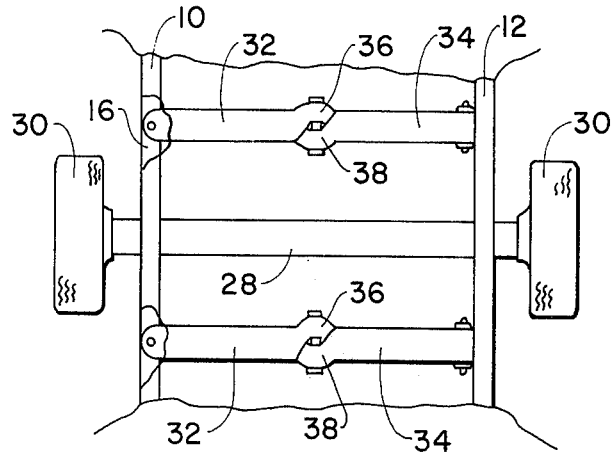
FIG. 4 is a modified version of the system shown in FIG. 2, the elevation of which corresponds to the elevation shown in FIG. 1.
Figures 3, 7:
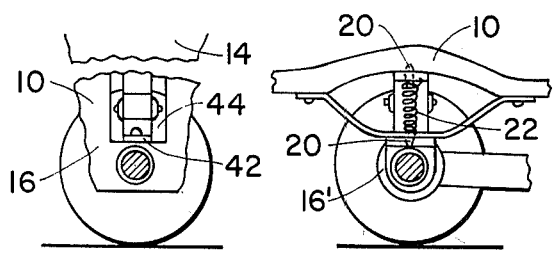
FIG. 3 is a side elevation of FIG. 1 with one wheel removed.
FIG. 7 is a side elevation of FIG. 5 with one wheel removed.

Referring now to the drawing, first and second frame members 10 and 12 project downwardly from a vehicle frame 14, to which they are attached, or form part thereof. First and second axle-bearer means 16 and 18 are attached to the first and second frame members 10 and 12, respectively, by either being integral therewith, as shown in FIGS. 1 and 3, or by means of bolts 20, in conjunction with respective springs 22 and 24, as shown, for example, in FIGS. 5 and 7, the axle-bearer means being denoted 16' and 18' in FIGS. 5 – 7. The axle bearer means 16 and 18 support a longitudinal and normally horizontal axle 28, on the respective ends of which there are normally attached two wheels 30.

First and second substantially horizontal and longitudinal control bars 32 and 34 are pivotably connected to one another at their respective centers 36 and 38 in a substantially mirror symmetrical and scissor-type manner. Each of the control bars 32 and 34 is formed as a leaf-spring 40 and 42 on one side of its respective center. Each leaf spring is formed with a downwardly opening concavo-convex curvature extending from the center of the control bar at least partly to an extremity of the leaf spring. The leaf springs 40 and 42 are attached to the axle bearing bearer means 18 and 16 near the extremities of these leaf springs respectively, and the ends of the control bars 32 and 34 disposed on the other side of the respective centers 36 and 38 are attached to the frame members 10 and 12, respectively.

Each of the springs 22 and 24 has lower and upper ends, respectively. The lower end of each compression spring is attached to a respective leaf spring, and axle bearer means, while the upper end is attached to a respective control bar end and frame member in the version of my invention illustration in FIGS. 5 to 7. In the version of my invention shown in FIGS. 1 through 4, and in FIG. 8 the frame members are unitary with the axle bearing and the ends of the control bars 32 and 34 are pivotably attached to the frame members 10 and 12, respectively. In this latter version of my invention the frame members 10 and 12 are also formed with respective recesses 44 and 46 into which the leaf springs 42 and 40 are extendable, for attachment to the frame members 10 and 12, respectively.

Figure 8:
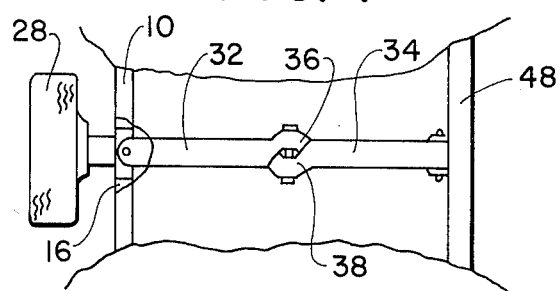
FIG. 8 is another modified version of the system shown in FIG. 1.
Figure 9:
FIG. 9 is a detail of a control bar used in the system illustrated in FIG. 1.

In FIGS. 1 through 7 I show control bars which are attached to respective frame members disposed symmetrically along the width of the frame 14, while in FIG. 8 I have shown control bars which are attached to two respective frame members 10 and 48, the frame member 48 being disposed approximately half-way through the width of the frame; this latter version of my invention is primarily suitable for vehicles having a width considerably larger than the width of a conventional vehicle. FIG. 9 shows a detail of a control bar terminating in a leaf spring.

Although the invention has been described with respect to a preferred form thereof, it is to be understood that it is not to be so limited since changes can be made therein which are within the full intended scope of this invention as defined by the appended claims.

What is claimed is:

1. A vehicle suspension system comprising:

first and second frame members projecting substantially downwards from a vehicle frame;

first and second axle bearer means attached to said first and second frame members, respectively, for supporting a transverse and normally horizontal axle, the axle having two opposite ends, one wheel being attachable to at least one of said ends;

first and second substantially horizontal and transverse control bars having respective centers and pivotably connected to one another at said centers in a substantially mirror-symmetrical and scissor-type manner, each of said control bars being formed as a leaf spring on one side of said center having an extremity, and a downwardly opening concavo-convex curvature extending at least partly towards said extremity, said leaf springs of said first and second control bars being attached to said second and first axle bearer means near the extremities of said leaf springs, respectively, said first and second control bars having ends on the other side of said center, respectively, each of the latter ends being attached to said first and second frame members, respectively.

2. A vehicle system according to claim 1 further comprising first and second compression springs having lower and upper ends, respectively, the lower ends of said compression springs being attached to said leaf springs and to said axle bearer means, respectively, and the upper ends of said compression springs being attached to said frame members and the control bar ends, respectively.

3. A vehicle system according to claim 1, wherein said first and second frame members are unitary with said first and second axle bearer means, respectively.

4. A vehicle system according to claim 3, wherein said first and second frame members are formed with recesses, and wherein said leaf springs of said second and first control bars extend thereinto for being attached to said first and second frame members, respectively.

5. A vehicle system according to claim 1 wherein said ends of said first and second control bars are pivotably attached to said first and second frame members, respectively.

* * * * *